United States Patent [19]

Handsaker

[11] Patent Number: 5,398,026
[45] Date of Patent: * Mar. 14, 1995

[54] RETRACTABLE BOAT SIGNALING MEANS

[76] Inventor: Jerrold L. Handsaker, 62 Smith Cir., Algona, Iowa 50511

[*] Notice: The portion of the term of this patent subsequent to Apr. 19, 2011 has been disclaimed.

[21] Appl. No.: 205,884

[22] Filed: Mar. 3, 1994

Related U.S. Application Data

[62] Division of Ser. No. 863,069, Apr. 3, 1992, Pat. No. 5,304,993.

[51] Int. Cl.⁶ ............................................. G08B 23/00
[52] U.S. Cl. .................................... 340/984; 114/343; 340/472; 362/286
[58] Field of Search ............... 340/984, 425.5, 468, 340/471, 472, 473; 116/26, 173; 114/364, 343; 362/61, 63, 285, 286, 386, 153.1

[56] References Cited

U.S. PATENT DOCUMENTS

| | | | |
|---|---|---|---|
| 2,420,772 | 5/1947 | Dalton | 362/61 |
| 3,128,448 | 4/1964 | Shumer et al. | 340/472 |
| 3,439,326 | 4/1969 | Boudin | 340/472 |
| 4,856,452 | 8/1989 | Pingel et al. | 362/61 |
| 4,870,543 | 9/1989 | Born et al. | 362/285 |
| 4,984,139 | 1/1991 | Goggia | 362/286 |
| 5,304,993 | 4/1994 | Handsaker | 340/984 |

*Primary Examiner*—Brent Swarthout
*Attorney, Agent, or Firm*—Zarley, McKee, Thomte, Voorhees & Sease

[57] ABSTRACT

A stern light or distress signaling transmitter is continuously electrically activated at any height above the hull of a boat and when not in use may be retracted and stored in a chamber below the deck in the hull. A motor driven drive cord is wound around a takeup reel and includes a pair of electrical connectors embedded therein which are in electrical contact with a power source through a pair of ring conductors mounted on a plate rotatable with the takeup reel. When the light is retracted it is flush with the top surface of the deck.

11 Claims, 2 Drawing Sheets

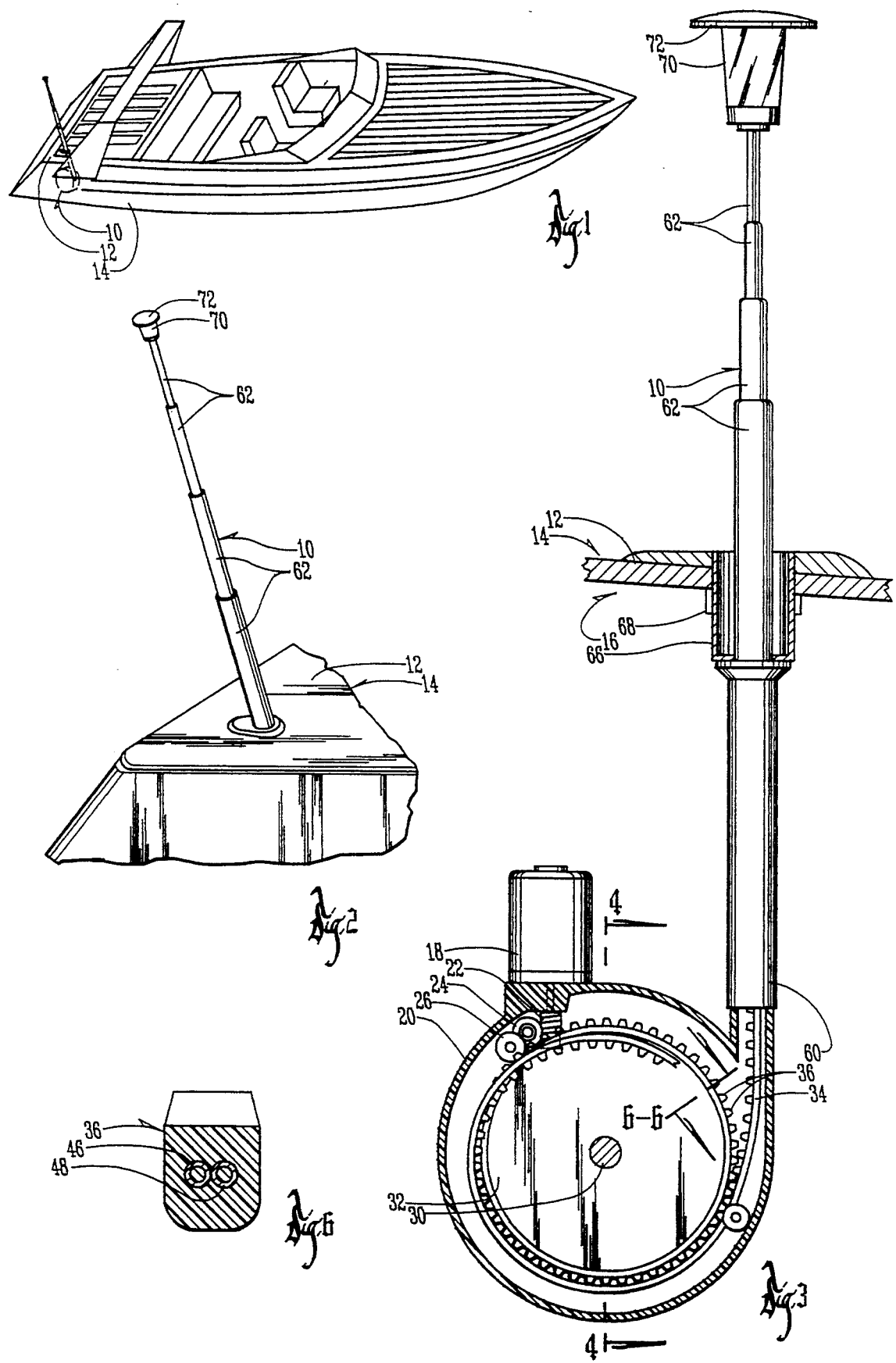

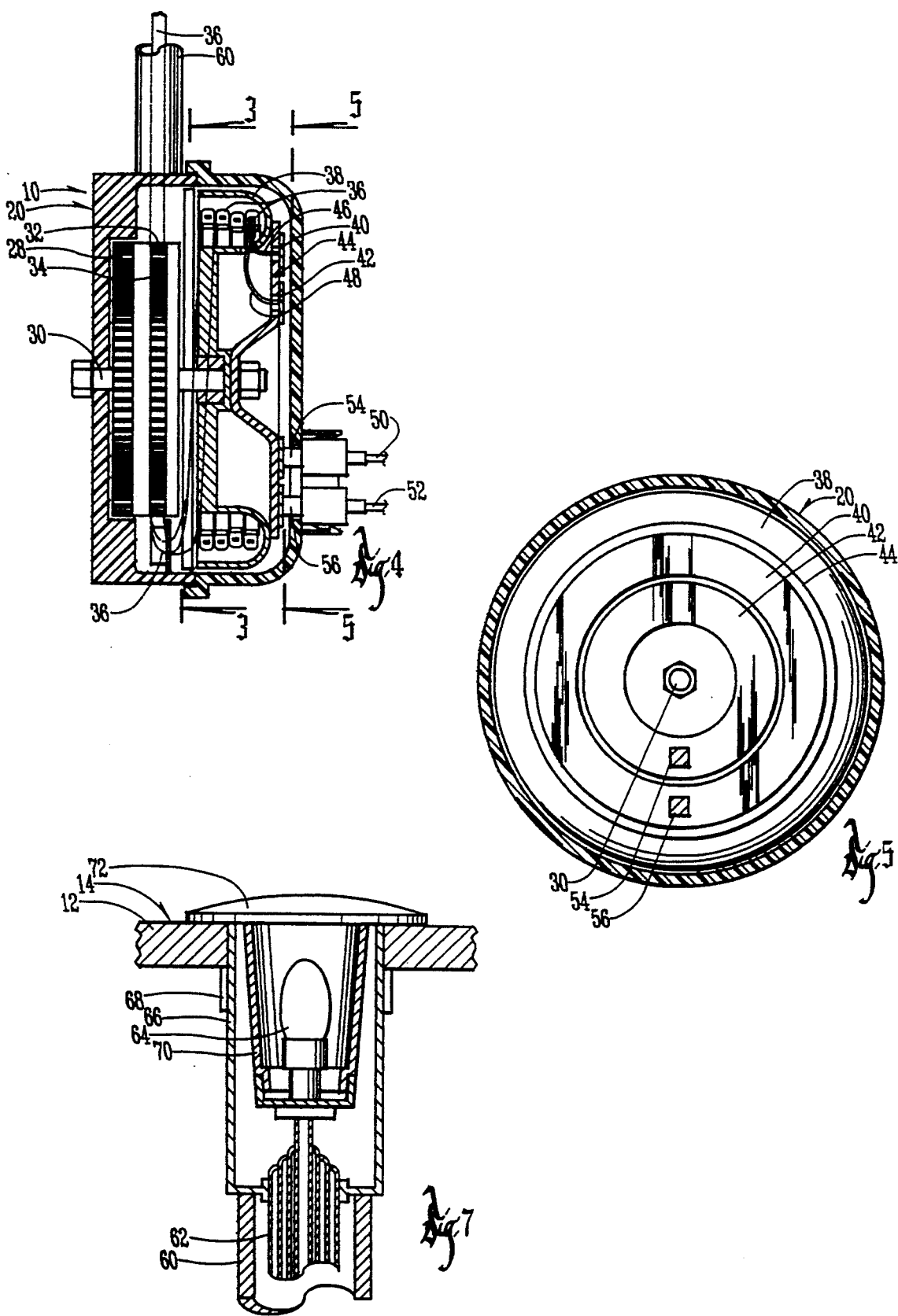

5,398,026

RETRACTABLE BOAT SIGNALING MEANS

This application is a division of application Ser. No. 07/863,069, filed Apr. 3, 1992, now U.S. Pat. No. 5,304,993.

BACKGROUND OF THE INVENTION

Coast Guard regulations require that the stern light on most motorboats be visible from all directions. This requires that the light be situated atop a pole which is the highest object on the boat. Rigidly mounted poles and lights created problems for boat owners when covering, docking, transporting and storing their boats. Early stern lights were mounted with a compression collar which could be released to allow a portion of the pole to slide downward into a cavity below the deck of the boat. While this lowered the profile of the boat when the light was not in use, it still left a large part of the light above the surface of the boat and often in the way of fishing, skiing and other boating activities. This embodiment had the following disadvantages:

1. The mounting bracket, adjustable collar, light and a part of the pole protruded from the surface of the boat deck at all times.

2. The height of the pole was limited to the depth of the below deck cavity.

3. The light had to be manually raised and lowered at the location of the light. Typically this location could not be reached by the vessel operator without leaving the controls of the boat.

Later, a light was developed which is removable. This created a smoother surface, leaving only the mounting ring and socket cover above the deck surface. This embodiment allowed the use of longer poles since they were not limited to the depth of the below deck cavity. This embodiment also has its share of disadvantages, some creating serious safety problems.

This removable light created storage problems for the pole when not in use. When the tube and light unit are removable, a separable electrical connection must be provided. The electrical connectors often fail due to vibration or corrosion leaving the operator of the boat with a defective, illegal, and potentially dangerous condition. Most such lights are located along the edge or rear of the boat and many lights have been dropped overboard during the installation or removal process. Finally, if the light produces a glare at night off the boats windshield for the driver, there is no way to adjust the light upward to eliminate the annoying and potentially blinding glare.

What is needed is a simple but effective signaling system that will allow the light to be operative at any desired height and the tube and light to be compactly stored below the deck of the hull in an interior chamber leaving no surface protrusions. The electrical connections must be foolproof to assure safety at all times of operation. Finally, the signaling system should be remotely operable from the boat driver's control panel.

SUMMARY OF THE INVENTION

The retractable boat signaling means of this invention in the preferred embodiment involves telescopic tube sections through which a pair of electrical wires extend embedded in a drive cord which is stored on a take up reel below the hull deck. The takeup reel is motor driven to raise and lower the light unit and electrical power is transmitted to the wires in the drive cord through brush contact with a pair of terminal rings rotatable with the takeup reel. Thus the light signaling unit is functional at all elevations and the drive cord allows the tube sections to be extended and held at any desired height without the aid of any further height adjusting means being employed.

The signaling unit may include the conventional stern light or a distress signal transmitter which may be used when help is needed. The signaling unit may be remotely operable from the boat drivers control panel.

DESCRIPTION OF THE DRAWINGS

FIG. 1 is a perspective view of a boat having the retractable signaling means of this invention.

FIG. 2 is a fragmentary enlarged perspective view of the signaling means mounted on the right rear corner of the stern.

FIG. 3 is a partial cross sectional view taken along line 3—3 in FIG. 4 and illustrating The drive system for raising and lowering the light unit.

FIG. 4 is a cross sectional view taken along line 4—4 in FIG. 3 illustrating The electrical Transmission means and drive cord takeup reel.

FIG. 5 is a cross sectional view taken along line 5—5 in FIG. 4.

FIG. 6 is a cross sectional view taken along line 6—6 in FIG. 4 illustrating the electrical conductors embedded in the drive cord.

FIG. 7 is a fragmentary cross sectional view illustrating the light unit in its lowered flush mounting position.

DESCRIPTION OF PREFERRED EMBODIMENT

The retractable boat signaling means of this invention is seen in FIG. 1 and referred to generally by the reference numeral 10. The signaling unit 10 is located at the stern 12 on a boat 14 and is stored below the deck top surface of the stern in an interior chamber 16. The signaling unit 10 includes a reversible motor 18 mounted on a housing 20. The motor 18 includes a worm gear 22 which drives a gear 24 in turn driving a gear 26. The gear 26 has teeth for driving a gear 28, as seen in FIG. 4, mounted on a bolt 30 which also carries a drive gear 32 in engagement with teeth 34 on a drive cord 36 wound on a takeup reel 38.

A pair of ring terminals 40 and 42 are mounted on a plate 44 in turn mounted on the bolt 30 to rotate with the takeup reel 38 and the gears 28 and 32. A pair of electrical conductors 46 and 48 are connected to the ring terminals 40 and 42 respectively and are embedded in the drive cord 36.

A pair of power supply electrical conductors 50 and 52 are mounted on the housing 20 and include brushes 54 and 56 in frictional electrical contact with the ring terminals 40 and 42 such that electrical power is transmitted to the wires 46 and 48 at all times.

The drive cord 36 extends from the housing 20 into A tube 60 which contains a plurality of telescopic sections 62 as seen in FIG. 3. The drive cord 36 is connected to the uppermost section 62 while the wires 46 and 48 embedded therein extend to a light 64 atop the uppermost telescopic section 62.

The tube 60 includes an upper end receptacle 66 flush mounted on the top surface of the stern 12 and held in place by a stop 68.

The light 64 is positioned in a lens housing 70 having a cap 72 which is flush with the stern 12 upper deck surface as seen in FIG. 7 when the signaling unit 10 is in its retracted lowered position.

Thus it is seen in operation that through use of the reversible motor 18 the drive cord 36 may be extended or retracted and when extended will raise the telescopic sections 62 to the position of FIG. 3 or when retracted to the position of FIG. 7. Electrical power at all times is supplied to the light 64 such that the light may be positioned at any desired height. Continuous electrical power is made possible by the use of the ring terminals 40 and 42 in constant frictional electrical contact with the brushes 54 and 56 connected to the input terminals 50 and 52.

It is understood that the light 64 could in the alternative be a distress signaling means to indicate help is needed.

What is claimed is:

1. A retractable signaling means in combination comprising, a body having an outer wall and an interior chamber, a signaling unit mounted in said interior chamber and having telescopic sections movable upwardly through said outer
wall between raised and lowered positions, a signaling
means mounted on the upper end of the uppermost telescopic
section,
a drive cord positioned in and extending along the axial center of said telescopic sections extending from the uppermost section to said interior chamber where it is coiled on a takeup reel, said cord including at least one electrical conductor connected at one end to said signaling transmitter and at the other end to a terminal ring mounted on said reel to rotate therewith, said drive cord having sufficient stiffness and strength to act in compression and tension to push said telescopic sections upwardly to said raised position and pull said telescopic sections down to said lowered position upon operation of said takeup reel,
an electrical source including at least one stationary electrical conductor in electrical contact with said terminal ring whereby said signaling means and electrical source are adapted to be continuously electrically interconnected between and during retracted and raised positions of said telescopic sections, and
said electrical source electrical conductor being in electrical contact with said terminal ring through a brush in electrical contact with said terminal ring.

2. The structure of claim 1 wherein said signaling means is further defined as being a light.

3. The structure of claim 1 wherein a geared drive means engages teeth along said drive cord for raising and lowering said telescopic sections.

4. The structure of claim 1 and said drive cord is sufficiently rigid to maintain a linear condition in said telescopic sections and flexible enough to be wound around said takeup reel.

5. The structure of claim 1 wherein said electrical conductor in said drive cord is one of a pair of electrical conductors which are insulated from each other.

6. The structure of claim 3 wherein said signaling unit includes a shaft on which said gear drive means, takeup reel and terminal ring are mounted for rotation.

7. The structure of claim 1 wherein the signaling means on the upper end of the uppermost telescopic section is received in a receptacle in a boat hull when in a lowered position to provide substantially a flush top hull surface.

8. A retractable signaling means in combination comprising, a body having an outer wall and an interior chamber,
a signaling unit mounted in said interior chamber and having at least one tube section movable upwardly through said outer wall between raised and lowered positions, a signaling means mounted on the upper end of the tube,
a drive cord positioned in and extending along the axial center of said tube extending from the uppermost section of the tube to said interior chamber where it is coiled on a takeup reel, said cord including at least one electrical conductor connected at one end to said signaling means and at the other end to a terminal ring mounted on said reel to rotate therewith, said drive cord having sufficient stiffness and strength to act in compression and tension to push said at least one tube section upwardly to said raised position and pull said at least one tube section down to said lowered position upon operation of said takeup reel,
an electrical source including a stationary electrical conductor in electrical contact with said terminal ring whereby said signaling transmitter and electrical source are adapted to be continuously electrically interconnected between and during retracted and raised positions of said at least one tube section and
said electrical source electrical conductor being in electrical contact with said terminal ring through a brush means in electrical contact with terminal ring.

9. The structure of claim 8 wherein said tube includes at least two telescopic sections.

10. The structure of claim 8 wherein the signaling means on the upper end of the tube is received in a receptacle in a boat hull when in a lowered position to provide substantially a flush top huh surface.

11. A retractable signaling means in combination comprising, a body having an outer wall and an interior chamber,
a signaling unit mounted in said interior chamber and having telescopic sections movable upwardly through said outer wall between raised and lowered positions, a signaling transmitter mounted on the upper end of the uppermost telescopic section,
a drive cord positioned in and extending along the axial center of said telescopic sections extending from the uppermost section to said interior chamber where it is coiled on a takeup reel, said cord including a pair of electrical conductors connected at one end to said signaling transmitter and at the other end to a pair of terminal rings mounted on said reel to rotate therewith, said drive cord having sufficient stiffness and strength to act in compression and tension to push said telescopic sections upwardly to said raised position and pull said telescopic sections down to said lowered position upon operation of said takeup reel,
an electrical source including a pair of stationary electrical conductors in electrical contact with said pair of terminal rings whereby said signaling transmitter and electrical source are adapted to be continuously electrically interconnected between and during retracted and raised positions of said telescopic sections, and
said electrical source electrical conductors being in electrical contact with said pair of terminal rings through a pair of brushes in frictional contact with said pair of terminal rings.

* * * * *